E. GLENNAN.
FERRULE.
APPLICATION FILED MAY 24, 1910.
986,164.
Patented Mar. 7, 1911.
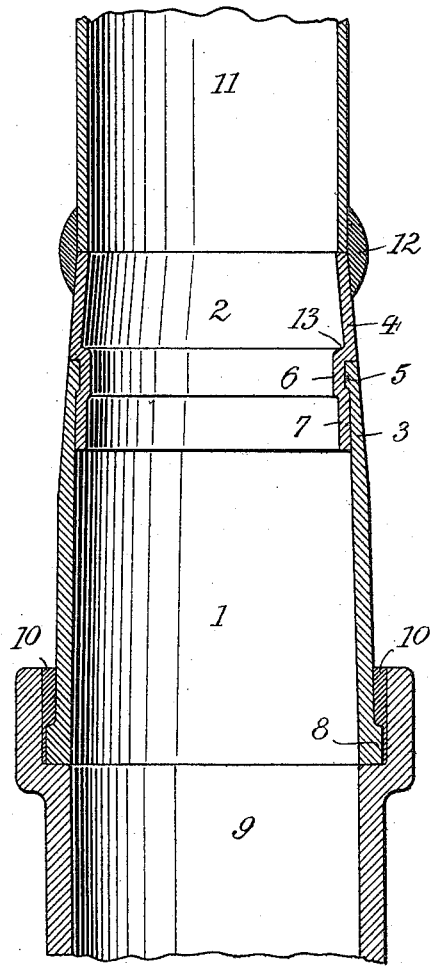
Witnesses:
Katheryne Koch
Daniel Holmgren.
Inventor
Edward Glennan
By his Attorneys
Briesen & Knauth

UNITED STATES PATENT OFFICE.

EDWARD GLENNAN, OF NEW YORK, N. Y.

FERRULE.

986,164.　　　　Specification of Letters Patent.　　Patented Mar. 7, 1911.

Application filed May 24, 1910. Serial No. 563,067.

*To all whom it may concern:*

Be it known that I, EDWARD GLENNAN, a citizen of the United States, residing at New York city, Brooklyn, county of Kings, and State of New York, have invented new and useful Improvements in Ferrules, of which the following is a specification.

This invention relates to a ferrule of novel construction for coupling pipes, and more particularly for connecting lead pipes to iron pipes. Such connections are frequently required in plumbing, for example between the leaden drain or ventilating pipes of a closet and the iron trap. For making the necessary solder joint between the lead pipe and the ferrule, it is necessary that the solder receiving surface of the latter be composed of brass or similar solderable metal. As a consequence the ferrules have heretofore generally been constructed entirely of brass, but as this metal is expensive, quality has frequently been sacrificed by unduly reducing size and weight.

By my invention, a strong and serviceable ferrule is obtained at greatly reduced cost, so that with but small expense an entirely reliable joint can be made.

The accompanying drawing represents a longitudinal section of my improved ferrule showing it in use.

The ferrule is composed of two parts, viz: an iron sleeve 1, and a brass or similar solderable bushing 2, which is overlapped by the sleeve and is firmly united therewith. Sleeve 1 has a flaring end 3, and bushing 2 is correspondingly flared as at 4 to be flush with the sleeve. Within flaring end 3 there is formed on sleeve 1, an integral flange 5, and in assembling the parts, the cylindrical end 6 of bushing 2 is inserted into the sleeve so as to be telescoped thereby. This cylindrical section 6 is set back from the face of bushing 2, and its outer diameter corresponds substantially to the inner diameter of flange 5, so that while the face of the bushing 2 is flush with the face of sleeve 1, the cylindrical section 6 of the former is snugly embraced by the flange 5 of the latter. After section 6 has been introduced into the sleeve in the manner described, that part thereof which underlies flange 5 is expanded against the inner wall of the sleeve as at 7, so that the parts become intimately united. It will be seen that the compound ferrule thus obtained is composed of two telescoping and firmly united end sections, the relative proportion of the parts being such that the cheaper iron section 1, is considerably longer than the more expensive brass section 2. At its lower end, sleeve 1 is provided with an integral outer flange 8, and is here adapted to be calked into a trap or similar iron device 9, as at 10.

The lead pipe 11, which is to be connected to bushing 2 may be set against the end of the latter, and soldered thereto by a wiped joint 12. If desired however, the pipe may be inserted into the bushing to rest against an inner shoulder 13 thereof, and then the wiped joint may be formed at the junction of the parts.

It will be seen that my ferrule is of great strength, is thoroughly serviceable and may be manufactured at a low cost.

I claim:

A ferrule composed of an iron sleeve having an inner flange at one end thereof, and of a solderable bushing which is flush with the sleeve and has a set back cylindrical section which is embraced by the flange, and projects with its end beyond the same, said projecting end being expanded against the inner face of the sleeve.

EDWARD GLENNAN.

Witnesses:
　THOMAS T. REYNOLDS,
　FRANK V. BRIESEN.

---

Copies of this patent may be obtained for five cents each, by addressing the "Commissioner of Patents, Washington, D. C."